Feb. 17, 1953 F. R. LANKFORD 2,628,512
ROTARY CUTTING TOOL
Filed Jan. 11, 1951 2 SHEETS—SHEET 2
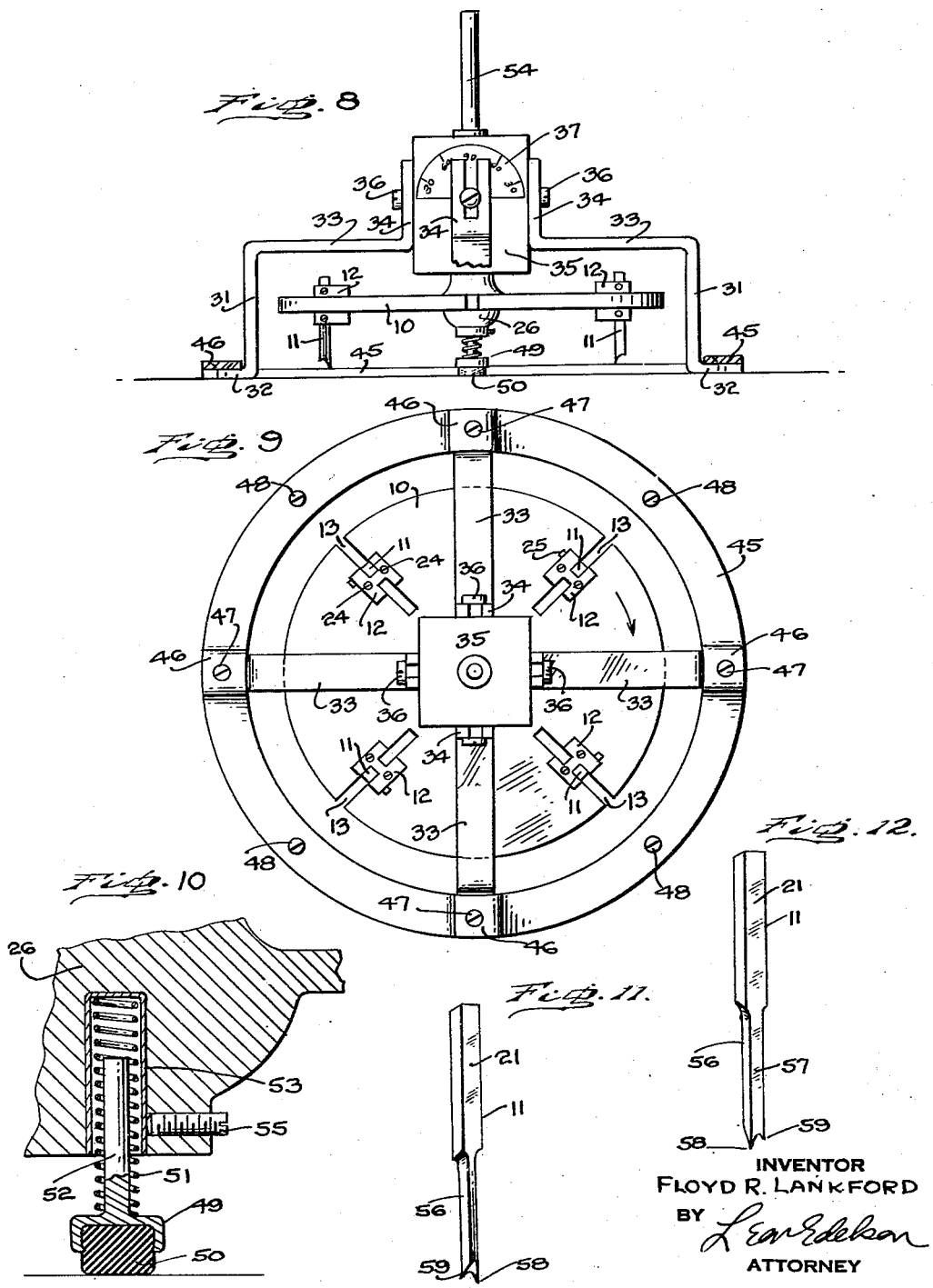
INVENTOR
FLOYD R. LANKFORD
BY Leon Edelson
ATTORNEY Patented Feb. 17, 1953

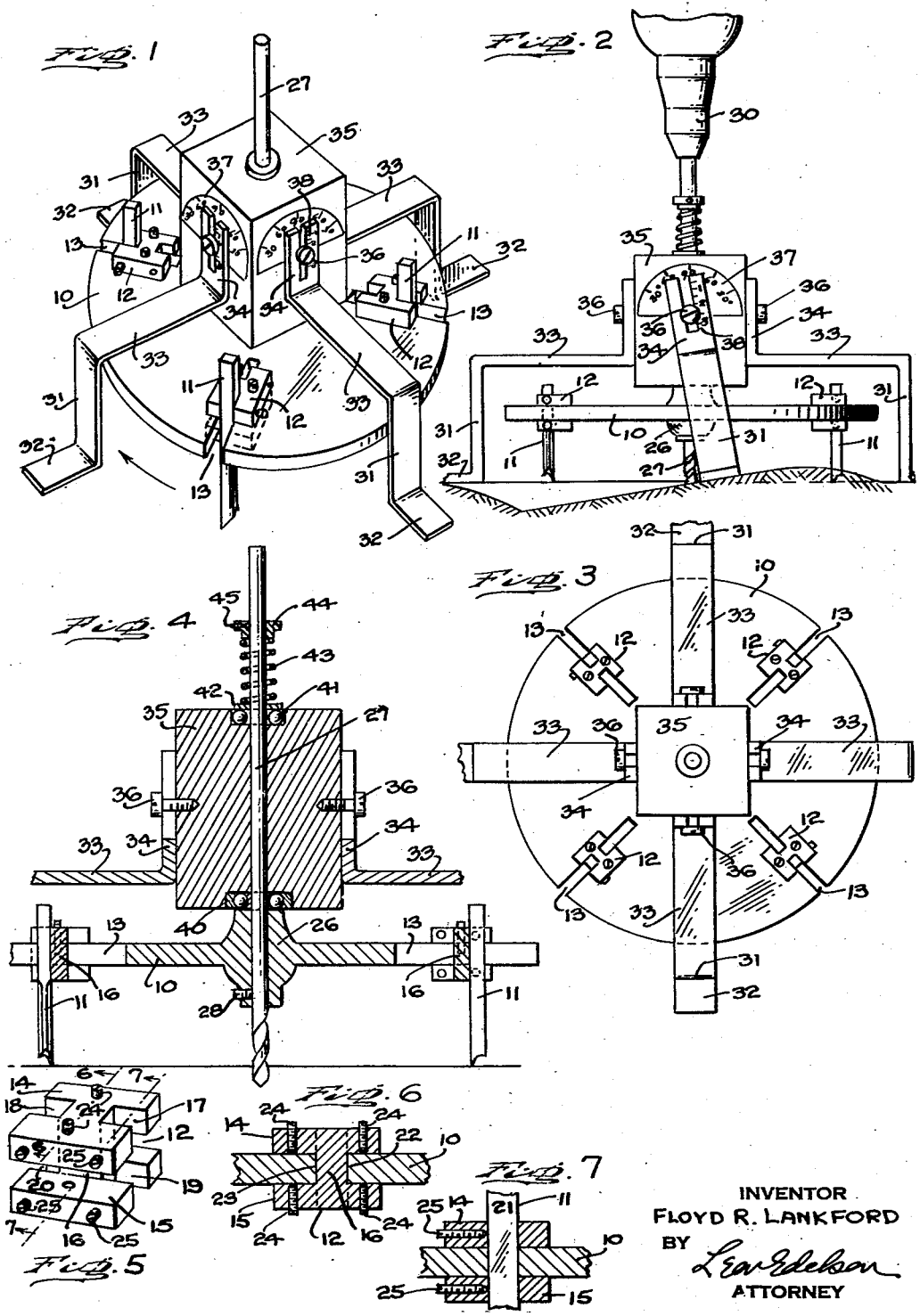

2,628,512

UNITED STATES PATENT OFFICE 2,628,512

ROTARY CUTTING TOOL

Floyd R. Lankford, Miami Beach, Fla.

Application January 11, 1951, Serial No. 205,449

13 Claims. (Cl. 77—69)

The present invention relates to metal and woodworking appliances and more particularly to an improvement in fly cutters.

One object of the present invention is to provide a fly cutter having an improved support for one or more cutting tools, one or more of which latter carried by their support may be operated in union.

Another object is to provide a fly cutter which is characterized by a cutting tool support in the form of a circular plate having provision therein for supporting one or more cutting tools at various positions adjusted radially with respect to the rotating axis of the fly cutter.

Another object is to provide a fly cutter wherein provision is made for effectively and accurately performing cutting operations upon irregular surfaces.

Another object is to provide a novel holder for tools used in association with a fly cutter.

Other objects and advantages of the present invention will appear more fully hereinafter, it being understood that the present invention consists substantially in the combination, construction, location and relative arrangement of parts, all as described in detail hereinafter, as shown in the accompanying drawings and as finally pointed out in the appended claims.

In the accompanying drawings:

Figure 1 is a perspective view of a fly cutter embodying one form of the present invention;

Figure 2 is a view in side elevation showing the cutter as applied to an irregular surface;

Figure 3 is a view in plan of the fly cutter;

Figure 4 is a view in sectional elevation partly broken away of the same, the section being taken through the axis of the cutter;

Figure 5 is a detail in perspective of one of the tool holders;

Figure 6 is a view in section on line 6—6 of Figure 5, as attached to the rotatable disc;

Figure 7 is a view in section on line 7—7 of Figure 5, showing a tool in place in the holder;

Figure 8 is a view in side elevation of a fly cutter embodying a modified form of the invention;

Figure 9 is a view in plan of the cutter of Figure 8.

Figure 10 is a detail view in section of a modified support pivot.

Figure 11 is a view in perspective of one form of cutting tool used with the cutter; and Figure 12 is a view in perspective of the opposite face of the cutter shown in Figure 11.

Referring to Figures 1 to 7 of the drawings, a rotatable disc 10 is provided as a support for cutting tools 11 and to transmit power thereto for cutting purposes. In the present instance provision is made for operatively mounting a plurality of cutting tools 11 in circumferentially spaced relation about and in radially adjusted position with respect to the axis of rotation of the disc, each tool having a separate holder 12 by which its tool is clamped in working position. The holders 12 are mounted upon the disc 10 for radial adjustment respectively in disc edge slots 13, which are so circumferentially spaced as to properly locate the tools 11 for cutting operations. Since the holders 12 are preferably all alike, this description will be directed to one, as illustrative of the others, but the same references will be applied to like parts in all.

Referring particularly to Figures 5 and 6, the holder 12 is shown as an integral body formed by an upper H-shaped part 14 and a lower H-shaped part 15, the two parts being symmetrically aligned and joined together by an interconnecting post 16 extending vertically between the respective bridges of the H-shaped members. Thus, the part 14 provides two oppositely disposed recesses 17 and 18, which are vertically alined respectively with identically located and dimensioned recesses 19 and 20 in the part 15. All of the said recesses are dimensioned and shaped to snugly receive the shank 21 of the tool to be mounted therein.

The parts 14 and 15 of each holder are spaced apart complementally to the thickness of the disc 10 to provide horizontally disposed ways 22 and 23 at opposite sides of the post 16 for snug sliding movement radially of the disc 10, when the holders are operatively assembled in the respective slots 13. Thus, the holders are adapted for radial adjustments on the disc 10 to locate the tools for cutting a hole or cutting out a disc or a ring of required diameter from a sheet or block of material. When located in the proper position each holder is arranged to be anchored by suitable fastening means, such as set screws 24, illustratively shown as frictionally engaging the two opposite faces of the disc 10. Also, an anchoring means is provided to rigidly clamp each tool in its holder, such means being here shown as set screws 25 respectively passing horizontally through the parts 14 and 15 of the holder to engage the tool shank 21 both above and below the disc 10. It will be noted that there are two set screws 25 traversing the part 14 and respectively alined with the recesses 17 and 18, while a second pair of set screws 25 traverse the part 15 and are respectively alined with the recesses 19 and 20.

In order to center the disc 10 and retain it in tool-working position while cutting, a hub 26 is centrally formed on the disc 10 to receive a driven centering member 27, such as a bit or twist drill, which, through the medium of a set screw 28, transmits motion to the disc 10. The centering member 27 is arranged for insertion in a driven chuck 30, as well known in this type of apparatus.

As a means for registering the disc 10, with its attached tools 11 for performing a cutting operation upon material, a plurality of legs 31 are provided, each preferably formed of strap metal bent to form a lateral supporting foot 32 as a bottom terminal of the leg, and a body 33 extending angularly from the top of the leg, generally horizontally, to terminate in a vertically disposed, bifurcated arm 34 arranged for face contact with one side of a rectangular bearing block 35, where it is adjustably retained by a headed pivot bolt 36 traversing the slot of the arm 34. As shown, there are four of the members having the legs 31, each with its arm 34 abutting a side of the block 35, and so attached thereto as to provide for both pivotal swing of the legs and vertical adjustment thereof relatively to their pivot bolts. For indicating angular swing set positions of the legs 31, each face of the block 35 adjacent the respective arms 34 is provided with a dial 37 graduated in degrees, while the arms 34 are themselves respectively provided with vertical scales 38 suitably graduated for leg-supporting lengths.

The block 35 forms a fixed bearing for the centering member 27 and has axially alined ball bearings 40 and 41 mounted in opposite ends respectively thereof, the former 40, when assembled operatively with the cutting unit, seating upon the hub 26, and the latter 41 seating a washer 42. A spring 43 is coiled about the centering member 27, said spring being compressed between the washer 42 and a follower 44 adjustably fixed to the member 27 by a set screw 45 whereby a yieldable downwardly directed pressure is maintained on the legs 31 to hold the feet 32 firmly pressed against the material which the fly cutter operates. The legs 31 are thus held in fixed relation to the work to maintain centering registration but the centering member 27 and spring follower assembly rotate relatively to the block 35, as does the fly cutter which is driven by the member 27. The legs 31 and block 35 thus form a unitary frame for accurately holding the fly cutter in operative position in respect to the work during the cutting operation.

In the operation of this above described form of the invention, and assuming a plane surface is to be cut, the tools 11 may be clamped in their respective holders 12, either in the outer recesses 17 and 19, or in the inner recesses 18 and 20. A wide range of radial adjustment is provided by shifting the holders 12 in the respective slots 13 to a selected position to locate the tools for the desired diameter of the hole or disc to be cut. The follower 44 is adjusted on the centering member 27 to compress and set the spring 43 as a limit to the axial travel of the member 27 in following the penetration of the tools 11 in the material. The arms 34 are set for vertically positioning the feet 32 to locate the tools against the material, and the upper end of the centering member 27 is clamped in the chuck of a drill or a drill press. The user grasps the leg bodies 33 to hold the appliance in place until the hole or disc is cut.

In the form of the invention shown in Figures 8 and 9, provision is made for anchoring the fly cutter to the work in order to eliminate manual holding during a cutting operation. As shown, this anchoring means comprises a hold-down ring 45 of such diameter as to encircle the legs 31 and seat upon the feet 32. At the respective contact locations of the ring 45 with the feet 32, upwardly disposed offsets 46 are formed in the ring to seal about the feet and be fixed by screws 47 as a complete assembly, thus providing a coplanar bottom surface for contacting the surface of the material. When the assembly is properly positioned upon the material for the cutting operation, the hold-down ring is secured to the material by screws 48 passing through the ring 45 into the material, thereby eliminating manual holding of the fly cutter while operating.

When it is desired to cut a disc from material without leaving a center mark thereon, the modified construction of Figures 8-10 may be employed. It will be observed that this modified form of the invention provided a fixed center in the form of a head 49 mounting a contact cushion 50, such as a rubber block, adapted to be held in contact with the material by a spring 51 coiled about the shank 52 of the head 49, and compressed between the head 49 and the closed end of a socket 53, which is axially set in the hub 26 of the disc 10 and in alinement with the motion-transmitting rod 54. This rod 54 is fixed to the hub 26 in any well-known manner and projects above the clock 35 for insertion in a chuck. The spring 51 projects the head 49 axially outward of the socket 53 for yielding pressure as a centering medium, but is relatively fixed while the hub 26 and socket 53 are relatively rotatable. A set screw 55 fixes the socket 53 within the hub 26 for rotation therewith and relative to the shank 52 of the fixed centering head and cushion 50.

The tools 11 which are preferably used with the fly cutter each comprise a shank 21 of rectangular or square section, to fit complementally into the holders 12, and a bit extension 56 having bevelled sides diverging to a relatively wide cutting face 57 terminating in a pair of laterally spaced cutting points 58 and 59, one of which is longer than the other for clean finishing cutting.

In tool as shown in Figures 11 and 12, the bit is provided with an inner cutting point 58 which is longer than the outer point 59, this tool being thus adapted to cleanly cut discs from material when the fly-cutter is rotated in the direction of the arrows shown in Figures 1 and 9. For cutting a circular hole in the material, the cutting points of the tool or tools used would be reversed from that shown in Figures 11 and 12, the outer point of each such cutting tool being the longer one to insure a clearly finished inner edge for the circular hole cut by the fly-cutter.

It will be apparent that the device of the present invention enables one to simultaneously cut a hole and a disc from the same piece of material, this being accomplished by securing the hole-cutting tool in the outer tool-receiving recesses of the radially adjustable tool holder and the disc-cutting tool in the inner tool-receiving recesses of the same or another one of the tool holders. Preferably, when both hole-cutting and disc-cutting tools are to be used simultaneously, they are respectively mounted in separate tool-holders or supports, because inasmuch as these latter are individually adjustable radially of the central axis of the fly-cutter, any desired diameters of hole and disc may thus be obtained within the limits of the permissible radial adjustment. If desired, the hole-cutting and/or disc-cutting tools may be employed in pairs, in which event each such pair of tools are mounted in separate holders 12, preferably disposed in diametrically opposed relation which are positionally adjusted radially of their central axis of rotation to insure movement thereof in tandem along the same circumferential line.

It will be understood, of course, that the present invention is susceptible of various other changes and modifiactions which may be made from time to time without departing from the general principles or real spirit thereof, and it is accordingly intended to claim the present invention broadly as well as specifically as indicated by the appended claims.

What is claimed as new and useful is:

1. A fly cutter comprising the combination of a disc having circumferentially spaced radially disposed slots open at their outer ends, tool holders carried by said disc and slidable respectively in said slots, means for individually locking said holders in adjusted positions within said slots, means for operable association with a drill chuck for centering and rotating said disc, a bearing block for said centering means, and means attached to said block for supporting said disc in position for tool engagement with material to be cut.

2. A fly cutter comprising the combination of a disc having circumferentially spaced radially disposed slots open at their outer ends, tool holders carried by said disc and slidable respectively in said slots, means for individually locking said holders in adjusted positions within said slots, means for operable association with a drill chuck for centering and rotating said disc, a bearing block for said centering means, and legs attached to said block for supporting said disc in position for tool engagement with material to be cut.

3. A fly cutter in accordance with claim 2 wherein the legs are vertically adjustable for varying the spacing of the disc relative to the material.

4. A fly cutter in accordance with claim 2 wherein the legs are respectively pivoted to the bearing block for adjustments for contact with irregular surface of the material.

5. A fly cutter comprising the combination of a disc having an open ended radially disposed slot, a holder for a tool comprising two spaced members and an interconnecting post, said post being slidable in said slot and said members straddling said disc, each of said members having a tool-receiving recess, said recesses being vertically alined, means for anchoring said holder in radially adjusted position in said slot, means for anchoring a tool in said recesses, means for operable association with a drill chuck for centering and rotating said disc, and means including a bearing for said rotating means for holding said disc in position for tool engagement with material to be cut.

6. A fly cutter in accordance with claim 5 wherein each holder member has two oppositely alined recesses, the recesses of one member being respectively alined with the recesses of the other member for selective mounting of a tool.

7. A fly cutter in accordance with claim 5 wherein the disc has a plurality of open radially disposed slots, and a plurality of tool holders are provided for respectice mounting in the slots.

8. A fly cutter comprising the combination of a disc, a spring-pressed centering member axially projecting from one face of said disc, means maintaining said member relatively fixed during rotation of said disc, means projecting from the opposite face of said disc for operable association with a drill chuck for rotating said disc, a bearing block for said rotating means, means for mounting a plurality of cutting tools on said disc radially spaced from said centering member, said tool mounting means including an open-ended radially extending slot in said disc and a tool holder slidably fitted in said slot for securement in adjusted position spaced radially from the center of the disc, and supporting means attached to said block to seat upon material to be cut for maintaining said disc in operative cutting position upon said material.

9. A fly cutter comprising the combination of a disc, a spring-pressed centering member axially projecting from one face of said disc, means maintaining said member relatively fixed during rotation of said disc, means projecting from the opposite face of said disc for operable association with a drill chuck for rotating said disc, a bearing block for said rotating means, means for mounting a plurality of cutting tools on said disc radially spaced from said centering member, individually adjustable legs attached to said block to seat upon material to be cut for maintaining said disc in operative position upon said material, and means anchoring said legs to the material for a cutting operation.

10. A fly cutter in accordance with claim 9 wherein the legs terminate in laterally disposed material contacting feet, and the anchoring means includes a ring seating on the feet.

11. A fly cutter comprising the combination of a disc, means for respectively centering and rotating said disc, holders for cutting tools mounted for radial adjustment on said disc, a bearing block for said rotating means, individually adjustable legs attached to said block, laterally disposed feet on said legs to seat upon material to be cut, said legs supporting said block above said disc and said legs being radially spaced from said disc, a ring seated on said feet, means for anchoring said ring to said feet, and means for anchoring said ring to said material for a cutting operation.

12. A cutting tool for fly cutters comprising a shank and an extension on said shank, said extension being of substantially triangular section and being provided at its terminal end with a pair of laterally spaced cutting points disposed coplanar with one face of said extension.

13. In a cutting tool as defined in claim 12 wherein one of said cutting points is of greater length than the other.

FLOYD R. LANKFORD.

REFERENCES CITED

The following references are of record in the file of this patent:

UNITED STATES PATENTS

| Number | Name | Date |
|---|---|---|
| 507,210 | Buchholz | Oct. 24, 1893 |
| 1,015,446 | Knapp | Jan. 23, 1912 |
| 1,946,214 | Kabigting | Feb. 6, 1934 |
| 2,501,036 | Fay | Mar. 21, 1950 |